United States Patent [19]

Takahashi et al.

[11] Patent Number: 4,628,373
[45] Date of Patent: Dec. 9, 1986

[54] ROTATING HEAD TYPE MAGNETIC RECORD/REPRODUCE APPARATUS

[75] Inventors: Hiroaki Takahashi; Shigeru Yamazaki; Takaharu Noguchi; Takao Arai, all of Yokohama, Japan

[73] Assignee: Hitachi, Ltd., Tokyo, Japan

[21] Appl. No.: 618,554

[22] Filed: Jun. 8, 1984

[30] Foreign Application Priority Data

Jun. 10, 1983 [JP] Japan .................................. 58-102606
Jun. 15, 1983 [JP] Japan .................................. 58-105879

[51] Int. Cl.$^4$ .......................... G11B 15/12; G11B 5/00
[52] U.S. Cl. ........................................ 360/62; 360/32; 360/64
[58] Field of Search ...................... 360/62, 53, 32, 63, 360/64

[56] References Cited

U.S. PATENT DOCUMENTS 4,489,354  12/1984  Dann ...................................... 360/64

Primary Examiner—Vincent P. Canney
Attorney, Agent, or Firm—Antonelli, Terry & Wands

[57] ABSTRACT

The rotating-head PCM record/reproduce apparatus has record and reproduce heads of which the reproduce heads are disposed to scan the recorded track formed by the record heads with a delay of a rotation angle of 90° thereby reading immediately after recording, and circuits for converting analog signal to digital signal, and for compressing the timebase of the digital signal, the compressed digital signal being supplied to the record heads so that no signal is supplied to the record head while the reproduce heads are reading the recorded signal.

2 Claims, 16 Drawing Figures

ROTATING HEAD TYPE MAGNETIC RECORD/REPRODUCE APPARATUS

BACKGROUND OF THE INVENTION

This invention relates to a helical-scan type rotating-head magnetic record/reproduce apparatus and, more particularly, to a rotating head PCM record/reproduce apparatus capable of so-called simultaneous monitoring of recorded signals or mixing by after-recording.

The conventional helical-scan rotating-head PCM recorder has the following recorded-signal monitoring mechanism.

As shown in FIG. 1, an analog signal is supplied through an input terminal 1 to an analog-to-digital converter (A/D converter) 2 by which it is converted to a digital signal. This digital signal is supplied through a digital signal processing circuit 3 of the recording system and a recording amplifier 5 to record/reproduce heads 7 by which it is recorded on a magnetic tape 8, and at the same time the digital signal to be recorded, as provided from the circuit 3, is supplied through a line 4, a change-over switch 12, and a digital signal processing circuit 13 of the reproducing system to a digital-to-analog converter (D/A converter) 14 by which the digital signal is converted to an analog signal, which is used as a signal to be monitored. That is, the signal being monitored is not a signal derived from the magnetic tape and reproduced therefrom, but is the signal being recorded thereon. Therefore, this simultaneous monitoring mechanism does not have the function to monitor the presence or absence of dropout and occurrence of errors after reading the recorded signal from the magnetic tape, which is one of the basic objects of the simultaneous monitoring.

On the other hand, in the Ampex-system video tape recorder, a plurality of heads are used and a reproduce head scans the recorded tracks at the time of recording for the purpose of simultaneous monitoring.

However, in the above recorder, since the recording current is continuously supplied to the record head, this recording current interferes with the relatively weak signal from the reproduce head. Thus, in general, to protect the reproduced signal from this interference, a conductor plate is disposed between the supply line for the recording current and the reproduced output line, thereby providing a shielding. This shielding means requires additional manufacturing processes, leading to high cost of the equipment. Also, the shielding effect itself is not practical.

SUMMARY OF THE INVENTION

Accordingly, it is an object of this invention to provide a rotating-head PCM record/reproduce apparatus in which the drawback of the prior art is obviated so that the recording signal does not interfere with the signal reproduced by the monitor head.

According to one aspect of the invention, there is provided a rotating-head PCM record/reproduce apparatus having both record heads and reproduce heads separated by, for example, 90° in the rotation direction and displaced by a predetermined track width in the track width direction so that both the record heads and the reproduce heads trace the same track, the record-/reproduce apparatus comprising means for converting an input signal to a digital signal and compressing the timebase of the digital signal to within the rotation angle, 90° of head, means for enabling the digital signal to be recorded on the magnetic tape only during this compressed period, or intermittently recording the time-base-compressed digital data, and means for reproducing the recorded signal on the magnetic tape during the period in which the digital data is not recorded i.e., during the non-compressed period, whereby the recording signal is not supplied to the record head while the reproduce head is reading the recorded digital data.

According to another aspect of this invention, upon recording of a signal, the reproduce heads are able to scan the recorded tracks, the signal to be recorded can be prevented from interfering with the reproduced signal, and it is possible to effect the simultaneous monitoring so that the recorded signal is reproduced just when it is recorded.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENTS

Figure 1:
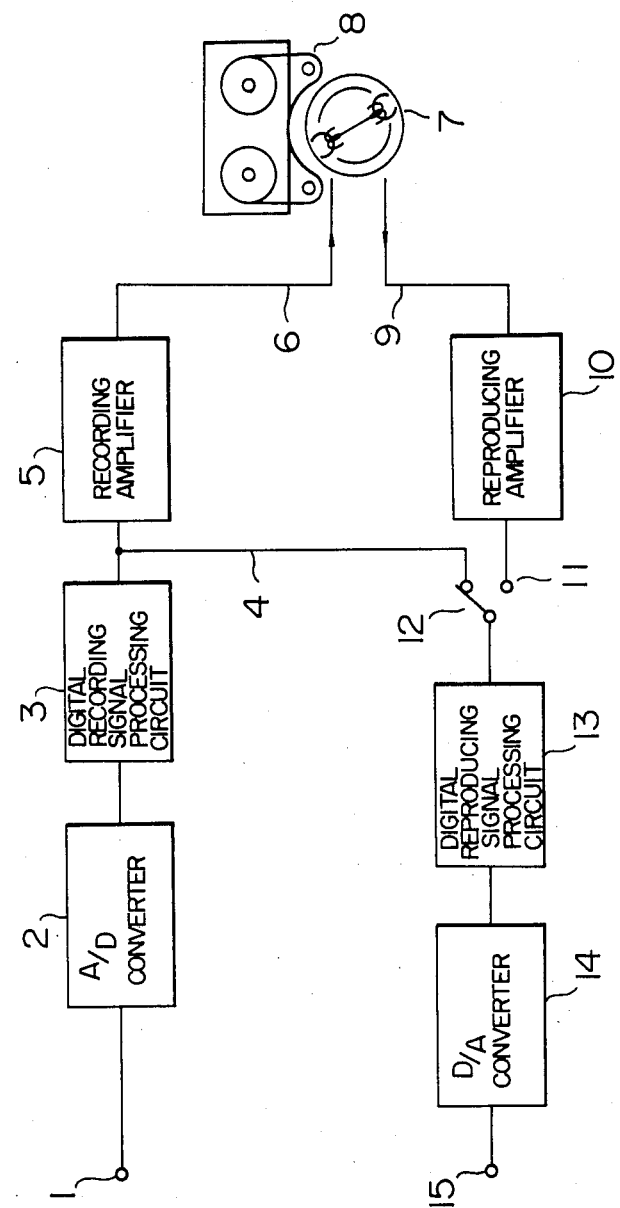
FIG. 1 is a block diagram of a conventional rotating-head PCM record/reproduce apparatus.
Figure 2:
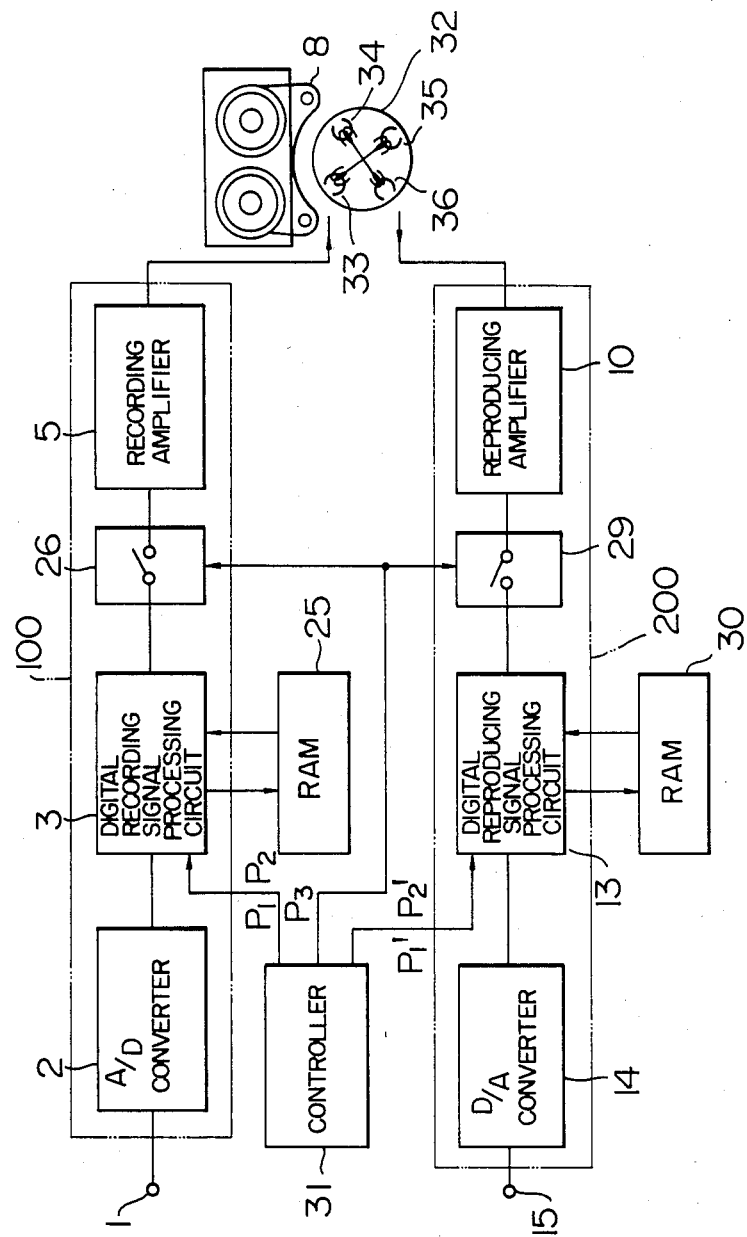
FIG. 2 is a block diagram of one embodiment of a rotating-head PCM record/reproduce apparatus of the invention.

One embodiment of this invention will hereinafter be described with reference to FIGS. 2 to 11. FIG. 2 is a block diagram of one embodiment of a rotating-head PCM recorder of this invention. This recorder has, as illustrated, means for compressing the timebase of an input signal and a recorded-signal using a simultaneous monitoring mechanism.

Referring to FIG. 2, there are shown an analog signal input terminal 1, and PCM recording signal processing means 100 having an A/D converter 2, a digital-signal processing circuit 3 for adding an error detecting/correcting code to the digital signal from the converter 2 (as well known) and a recording amplifier 5. There are also shown a magnetic tape 8, a pair of magnetic record heads 33 and 35, and a pair of magnetic reproduce heads 34 and 36, the record heads and reproduce heads being alternately positioned in contact with the tape 8 for tracing the same track one after the other as will be described later. The reference numeral 200 designates a PCM reproducing signal processing means having a reproducing amplifier 10 for amplifying the digital data reproduced by reproduce heads 34 and 36, 13 designates a digital signal processing circuit for error-detection and error-correction processing of the input digital data (as well known) and 14 designates a D/A converter for converting this digital data to an analog signal. The reference numeral 15 designates an analog signal output terminal.

The reference numerals 25 and 30 designate random access memories (RAMs) which are respectively coupled to the digital signal processing circuits 3 and 13 of the recording and reproducing systems so as to write and read the digital signals which are added to an error-detection and error-correction code or processed to detect and correct for error by the processing circuits 3 and 13. There are also shown record/reproduce change-over switch circuits 26 and 29 which are respectively provided on the recording and reproducing system lines, and control means 31 for controlling the RAMs 25 and 30 and switch circuits 26 and 29 at predetermined timings. This control means 31 comprises a timebase conversion control section 31a for converting (compressing and expanding) the timebase of the digital data written in and read from the RAMs 25 and 30 through the digital signal processing circuits 3 and 13, and a record/reproduce change-over control section 31b which is coupled to the switch circuits 26 and 29 so as to turn on/off the circuits alternately at equal intervals of time, thereby switching recording and reproducing modes. These control sections can be constructed by the combination of, for example, reference oscillators and frequency dividers.

The operation of this circuit arrangement will be described. An analog signal (for example, audio signal) supplied to the input terminal 1 is converted by the A/D converter 2 to a digital signal. This digital signal is added to error-detection and error-correction code in the digital recording-signal processing circuit 3 and is then fed to and stored (written) in the RAM 25. The RAM 25 stores a predetermined amount of data and then reads out data in a certain order. The operation of the digital recording-signal processing circuit 3 will further be described in detail with reference to FIG. 3.

Figure 3:
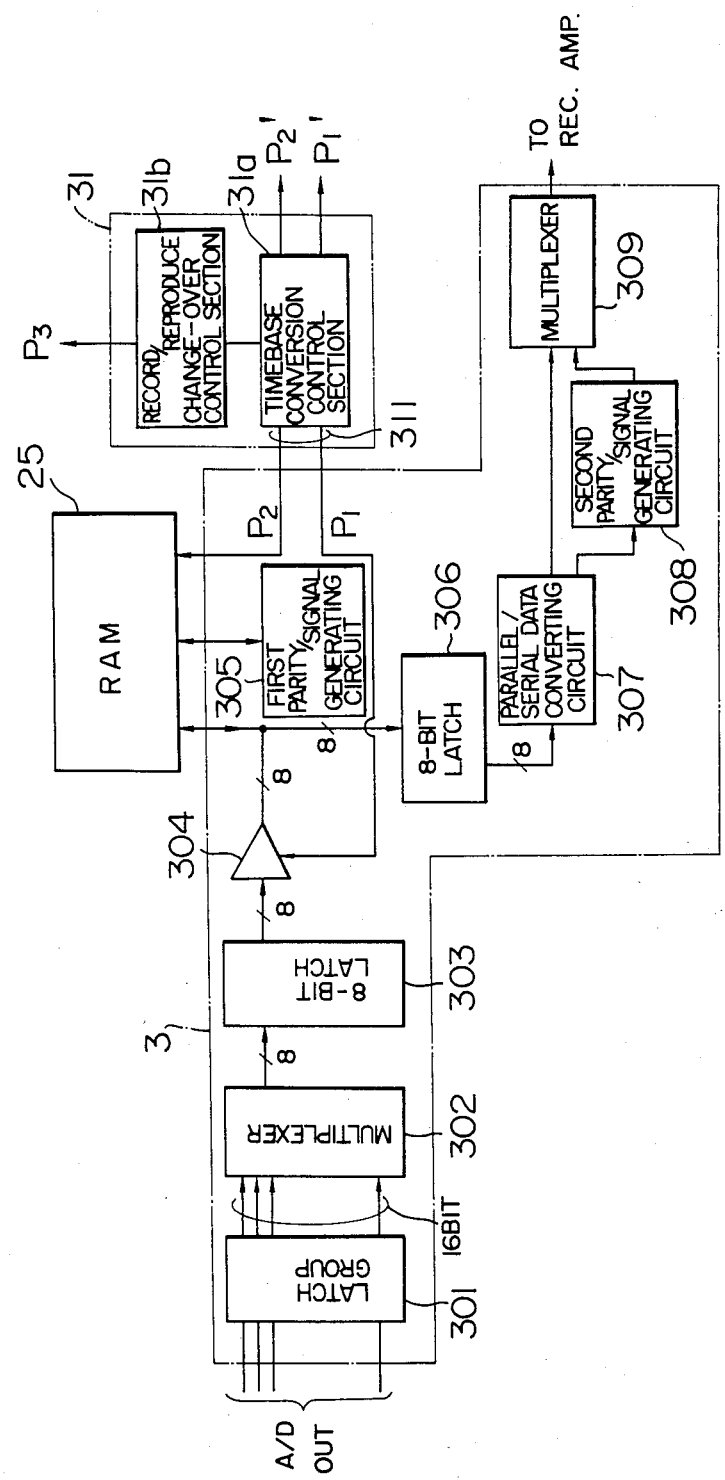
FIG. 3 is a block diagram showing the relation among a digital signal processing circuit, a random access memory (RAM) and control circuits therefor.
Figure 4:
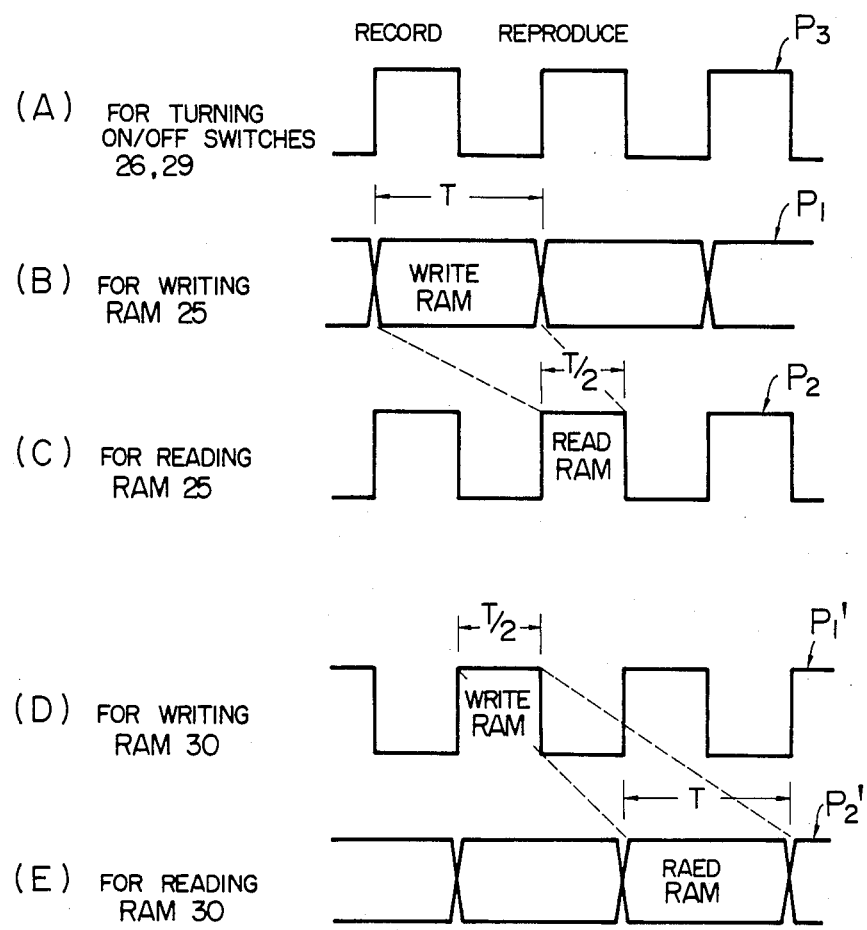
FIGS. 4 to 6 are waveform diagrams useful for the explanation of the invention.

FIG. 3 is a more detailed block diagram of the digital recording-signal processing circuit 3. Referring to FIG. 3, there are shown a latch group 301 for latching the parallel signals of 16 bits from the A/D converter 2, a multiplexer 302 for separately producing groups of the upper 8 bits and lower 8 bits of the parallel signals of 16 bits, an 8-bit latch 303, a three-state buffer 304 for input to or output from the RAM 25, a first parity-signal generating circuit 305, an 8-bit latch 306, a parallel/-serial data converting circuit 307, a second parity-signal generating circuit 308, and a multiplexer 309 for selecting a signal. the digital signal of 16 parallel bits produced from the converter 2 is fed to the latch group 301, where it is latched. Then, at the multiplexer 302, these 16 bits are separated into two groups consisting of the upper 8 bits and the lower 8 bits (each group of 8 bits is called one symbol). Each symbol is latched in the 8-bit latch group 303. The 8-bit data is fed through the three-state buffer to the external RAM 25. Each symbol is stored at a certain address in the RAM 25 and then fed to the first parity generating circuit 305 in a certain order. At the first parity generating circuit 305, the data is added to an error correcting signal and is fed back to the RAM 25. The data from the RAM 25 is again fed to the 8-bit latch 306 in another certain order. The 8-bit parallel signal from the latch 306 is supplied to the parallel/serial converting circuit 307 by which it is converted to serial data, which data is fed to the second parity-signal generating circuit 308 and to the multiplexer 309. The second parity-signal generating circuit 308 responds to the data fed from the parallel/serial converting circuit 307 to generate a second parity-signal, which is fed to the multiplexer 309 at a predetermined timing.

As described above, the output signal from the A/D converter 2 is converted to a digital signal. At this time, the digital data continuously fed from the A/D converter 2 is stored in the RAM 25, and when the stored data is read, its timebase is compressed. Thus, the data fed to the recording amplifier 5 becomes discontinuous. The compression of the timebase of the digital data is effected under the control of the RAM writing and reading command signals (clocks) P1 and P2 from the timebase conversion control section 31a of the control means 31. This timebase compression can be achieved by setting the write and read clocks P1 and P2 to the RAM 25 so that as shown in FIGS. 4B and 4C, the reading operation in the RAM 25 is effected at twice the speed of the writing operation therein, or that the reading time (T/2) is ½ the writing time (T).

The timebase-compressed digital data is fed through the switch circuit 26 and recording amplifier 5 to the pair of record heads 33 and 35, by which it is recorded on the magnetic tape 8.

The switch circuit 26 is controlled to turn on in response to the positive component of the switching pulse P3, as shown in FIG. 4A, from the record/reproduce switching control section 31b.

The reproduction operation will be described with reference to FIG. 2.

The reproduced signal from the pair of reproduce heads 34 and 36 is fed through the reproducing amplifier 10 and the switch circuit 29 to the digital-signal processing circuit 13, by which it is processed for error detection and correction. The digital signal from the circuit 13 is fed to the RAM 30, in which it is stored (or written). Then, it is read from the RAM 30. When the digital data is read out from the RAM 30, its timebase is expanded. The RAM 30 expands the timebase expanded data to the normal timebase data. The normal timebase data fed from the RAM 30 to the D/A converter 14 is converted to a continuous analog signal.

The timebase expansion of the digital data is effected under the control of the RAM writing and reading command signals (clocks) P1' and P2', as shown in FIGS. 4D and 4E, from the timebase conversion control section 31a of the control means 31. This can be achieved by setting the write and read clocks P1' and P2' to the RAM 30 so that the reading operation in the RAM 30 is made at ½ the speed of the writing operation therein, or that the reading time (T) is twice the writing time (T/2). The timebase-expanded digital data is restored to the original analog signal by the D/A converter 14 and fed to the output terminal 15.

The flow of signals with time will be described in detail with reference to FIGS. 5 and 6.

Figure 5:
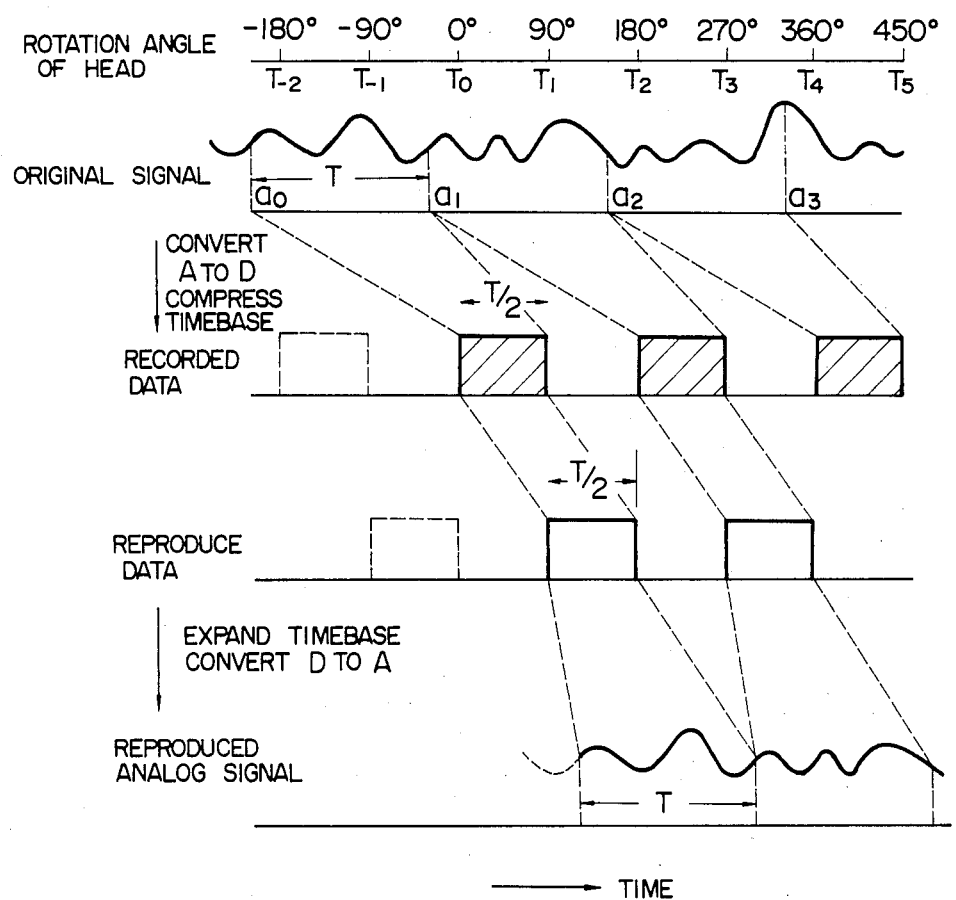

FIG. 5 shows the change of recorded and reproduced signals with time. As shown in FIG. 5, times $T_0$, $T_1$, $T_2$ ... are specified at intervals of the rotation angle 90° of the head and the original analog signal is partitioned as $a_0, a_1, a_2 \ldots$ at equal intervals of time. A signal of one interval, for example, time T from $a_0$ to $a_1$ is digitized, compressed in its timebase to be within the time of the rotation angle 90° of the head, and the resulting signal is recorded on the tape. The signal between times $a_0$ and $a_1$ as shown in FIG. 5, is recorded by the record head 33 or 35 during the time of one-scan from time $T_0$ to $T_1$. Thus, the recording current becomes discontinuous when the signal within the time $(a_1-a_0)$ is compressed in its timebase to the signal within the time $(T_1-T_0)$ provided that $(a_1-a_0)=(T_1-T_0)/2$. That is, there is a period in which no recording current is supplied. The feature of this invention is that during this period in which the recording current is not supplied to the recording heads, the track already formed is scanned by the reproduce heads so as to be monitored. In other words, the data to be reproduced is read by the reproduce head 34 during the time between the recorded data units, and then expanded in its timebase to be restored to the original analog signal.

Figure 6:
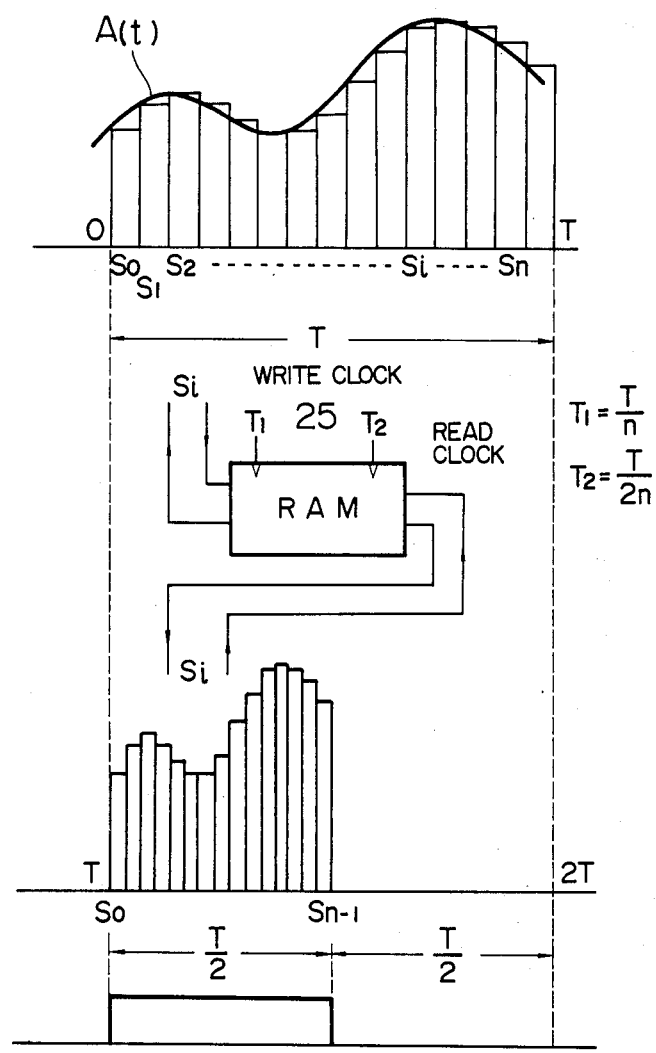

FIG. 6 shows how to compress and expand the timebase by use of a RAM (random access memory). As shown in FIG. 6, an original analog signal A(t) of time 0 to T to be recorded is converted to digital data of a series of $S_0, S_1, \ldots S_{n-1}$ at sampling intervals of $T/n$. This data series is serially fed into the RAM 25 for timebase compression and stored therein in syncronism with the write clock P1 the period $T_1$ of which is $T/n$. Immediately after all the data of $S_0$ to $S_n$ has been stored in the RAM 25, the data is read in response to the read clock P2 of period $T_2$. This period $T_2$ is half the period $T_1$, or $T/2n$. Thus, all data is read in $T/2$, of half the sampling period as shown in FIG. 6. The timebase compressed signal is recorded on the magnetic tape by the record heads 33, 35. The signal to be recorded is supplied only during the period $T/2$ as shown in FIG. 6, and the remaining $T/2$-period is the period in which no signal to be recorded is supplied. Therefore, if the recorded signal is read during this latter period of $T/2$, the output from the reproduce heads can be taken out with no interference from the recording current. This reproduced signal undergoes the same processings by the RAM 30 as those for recording but in the reverse order to reproduce the original analog signal.

Figure 7:
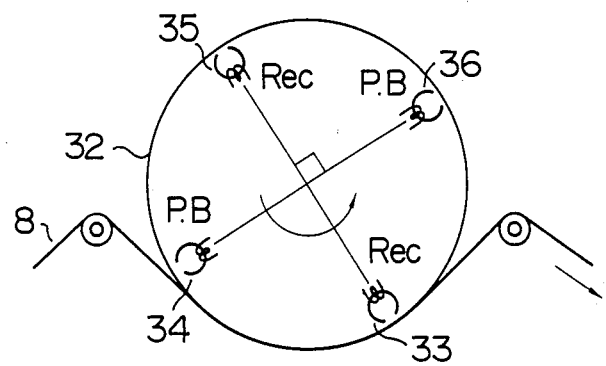
FIG. 7 shows the heads of a head cylinder which can be used in the one embodiment of this invention.
Figure 8:
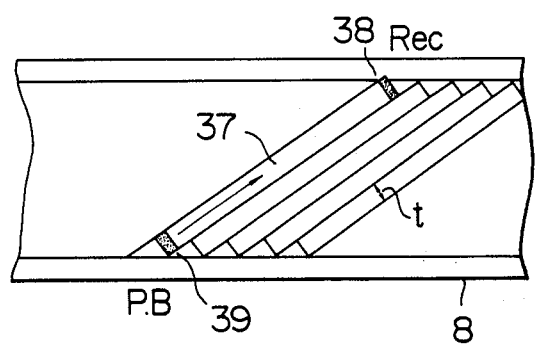
FIG. 8 shows the recorded pattern and positions of heads on the tape.
Figure 9:
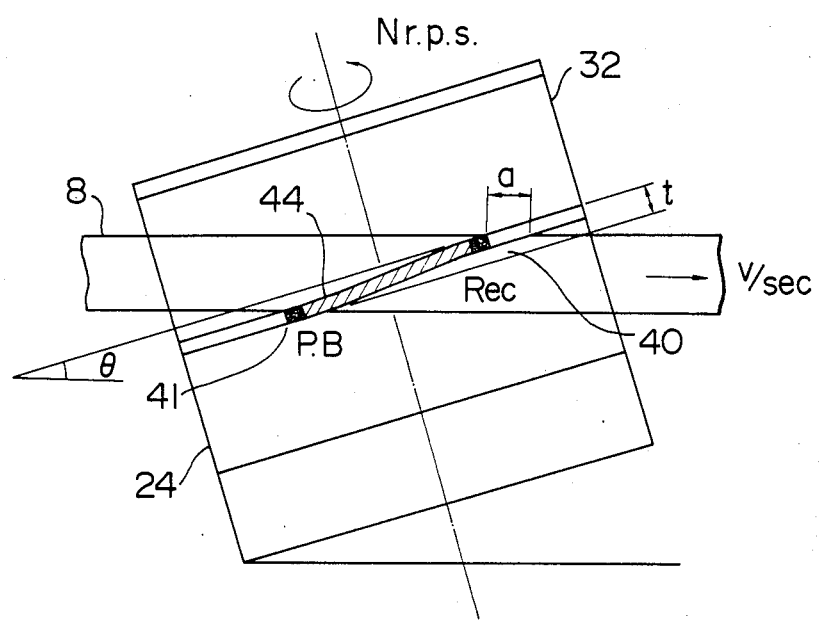
FIG. 9 shows the position of each head when viewing from the side of the cylinder.

While the action of the signal to be recorded and the reproduced signal relating to the timebase is described above, the mechanism necessary for effecting the recording and reproducing on the tape will be described below with reference to FIGS. 7 to 11. FIG. 7 shows the positional relation between the rotating magnetic heads as viewed from the top of the cylinder, FIG. 8 shows the positional relation between the recorded tracks and the magnetic heads on the tape, and FIG. 9 shows the positional relation between the record and reproduce heads when viewing the head cylinder from the tape transport direction. In FIG. 7, there are shown the head cylinder 32, first magnetic record head 33, first magnetic reproduce head 34, second magnetic record head 35 and second magnetic reproduce head 36. The magnetic tape 8 is transported and the head cylinder 32 rotated in the illustrated arrow-directions. In order that the signal recorded by the head 33 is read by the reproduce head 34, it is necessary to wrap the tape around the cylinder 32 over an angle (wrap angle) of 90° or below and to dispose the reproduce head 34 at a position which is deviated in the width direction of the tracks by the distance that the tape is moved during one-scan period of the record head 33, from the position at which the record head 33 is mounted.

FIG. 9 shows the positions at which the record and reproduce heads 33 and 34 are mounted. In FIG. 9, there are shown a position 40 where the record head 33 has completed one scan, a position 41 where the reproduce head 34 has begun its scan, and a one-scan track 44 formed by the record head 33. If the tape transport speed is v/sec, and the revolution rate of the cylinder 32 is N r.p.s. the time taken to scan once is $\frac{1}{4}N$ sec and the length a of the tape fed in this time is given by $a=v/4N$. Thus, if the track angle is represented by $\theta$, the width t of one track is $a\cdot\sin\theta$, or $a\cdot v\cdot\sin\theta/4N$. Therefore, the displacement between the record and reproduce heads 33 and 34 in the track width direction is equal to $a\cdot v\cdot\sin\theta/4N$ by which the reproduce head 34 is advanced relative to the record head 33. Thus, if the reproduce head 34 is mounted in this way and if the recording current is intermittently supplied as described above, the signal recorded by the head 33 can be read immediately by the reproduce head 34.

Figure 10:
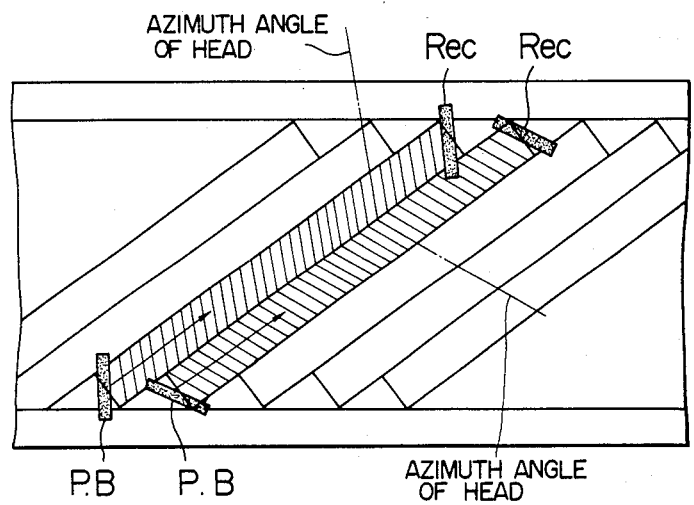
FIG. 10 shows one example of azimuth recording in this invention.

In addition, when magnetic heads of different azimuth angles for adjacent tracks are used upon recording as in home video tape recorders, in FIG. 10 the heads 33 and 34 are of the same azimuth angle, and heads 35 and 36 are also of the same azimuth angle. Thus, the signal recorded by the record head 33 can be reproduced without azimuth loss by the reproduce head 34, and any crosstalk from adjacent tracks can be removed by aximuth loss. The heads 35 and 36 also have the same effect.

Figure 11:
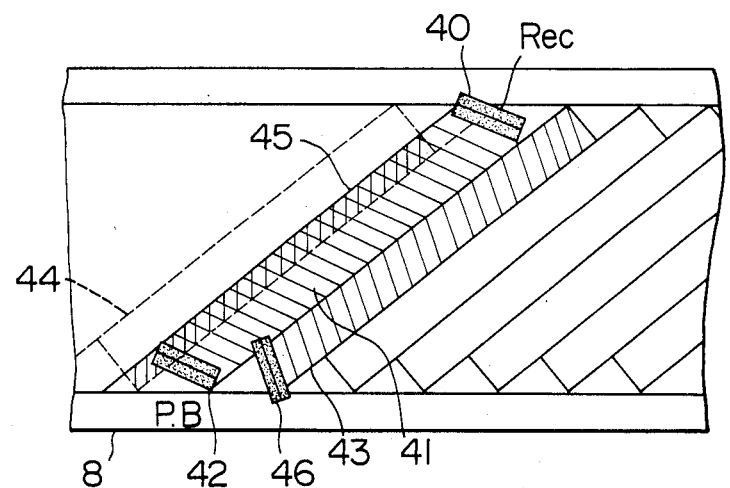
FIG. 11 shows one example of the overlapped recording in this invention.

FIG. 11 shows the case where one side edge of the recorded track is recorded again, or in an overlapping manner. In FIG. 11, 40 indicates the position at which the record head 33 has completed one-scan, 41 the track just formed by the head 33, 42 the position at which the reproduce head 34 mounted as mentioned above is about to scan the track, 43 another track formed one-scan previously, and 44 still another track to be formed one-scan later. In the overlap recording of FIG. 11, an overlapped portion 45 is created between the track 42 formed one-scan previously and the adjacent track, and thus the finally remaining track width is narrower than the width of the recorded track by the width of the overlapped portion 45. Under this condition, when the track recorded by the record head 33 is immediately scanned by the reproduce head 34 so that a signal is reproduced therefrom, the S/N ratio of the reproduced signal is improved by the amount corresponding to the excess track width because the track width to be scanned is wider than in the normal reproduction after recording. In the reproduction of the PCM signal, since the S/N ratio is directly concerned with the error rate of data, the fact that the S/N ratio from the immediate scanning by the reproduce head is different from that in the normal reproduction will result in there being no function of checking if the signal is properly recorded, which is the object of simultaneous monitoring. Therefore, in this case, the track having its width already reduced by the overlapping recording must be scanned by the reproduce head. In FIG. 11, 46 represents the position of the reproduce head 34 or 36 which is mounted at a position where it is able to scan the track 43, one-track before the track 41 that is formed just after the one-scan recording has been finished. Thus, if the track 43, one-track before the track 41 formed just after the recording, is scanned by the reproduce head 46, the width of the track 46 to be reproduced is the same as in the normal reproduction, and therefore the recorded signal can be monitored under the same condition as in the normal reproduction.

Also in the overlapped recording as shown in FIG. 11, when the azimuth angle is different between the adjacent tracks, the azimuth angle of the reproduce head is made to be coincident with that of the recorded track to be scanned, by the reproduce head, thereby enabling the crostalk from the adjacent tracks to be removed upon reproduction.

According to the above embodiment of this invention, the track on which a signal is recorded by the record head can be traced by the reproduce head immediately after the recording or one to several scans later, and since the recording current is intermittant while the reproduce head is picking up the signal, it is possible to remove the interference of the recording current with the weak reproduce signal at the rotary transformer. Accordingly, even upon recording it is possible to check if the recorded signal is properly recorded on the magnetic tape, under the same condition as in the normal reproduction, and also in the rotating-head system, the so-called simultaneous monitoring mechanism can be realized.

While in this embodiment, the record and reproduce heads are mounted with an angular spacing of 90° in the magnetic recording/reproducing system whose tape-wrapping angle is 90° so that recording and reproducing are alternately effected at equal intervals of time corresponding to rotation angle 90° of the heads, this invention can be applied to the case where the time during which the signal is being recorded on the tape is shorter than the time corresponding to the rotation angle of the 90° of heads. This is because the recorded signal can be read by the reproduce head and monitored within the time in which no recording current is supplied. Therefore, this invention can be applied to the magnetic recording/reproducing system in which even if the tape wrapping angle is, for example, 180°, the time during which a signal to be monitored is recorded corresponds to a rotation angle of 90° or below. Moreover, the tape wrapping angle can be arbitrarily selected depending on the relation between the recorded track length and the diameter of the cylinder.

Figure 12A:
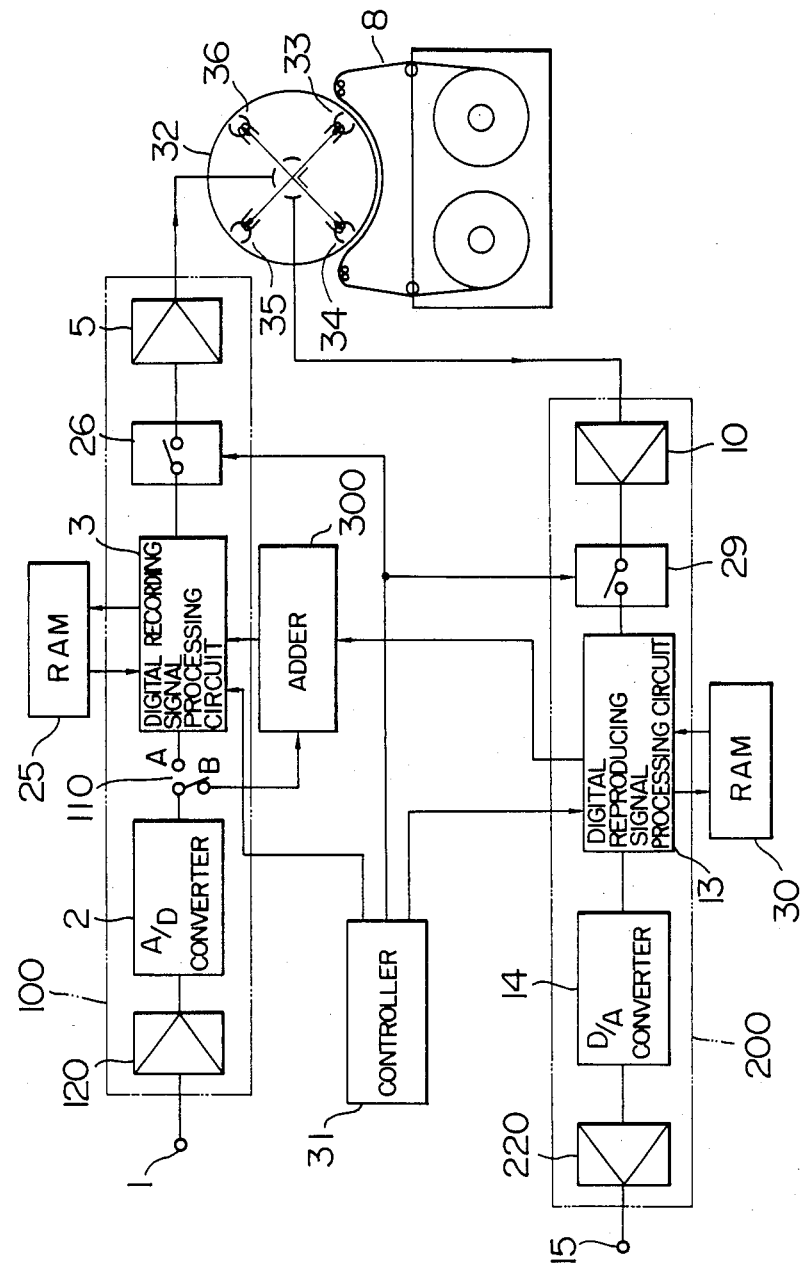
FIG. 12A is a block diagram of another embodiment of a rotating-head PCM recorder of this invention.

FIG. 12A is a block diagram of another embodiment of a rotating head PCM recorder of this invention. This embodiment includes additional portions, that is, a digital adder 300 for adding the output signal (digital signal) from the A/D converter 2 of the PCM recording signal processing means 100 and the output signal (digital data) from the digital-signal processing circuit 13 of the PCM reproducing signal processing means 200 and for supplying the sum to the digital recording signal processing circuit 3, and a change-over switch 110 for selectively supplying the output signal from the A/D converter 2 to the digital-signal processing circuit 3 and the adder 300.

In this embodiment, the reproduce heads 34 and 36 are respectively mounted to be one to several tracks ahead of the record heads 35 and 33, in the track-width direction, thereby enabling the mixture of the signal from the reproduce head and the signal applied to the input terminal 1 to be recorded again on the original track (mixing by after-recording). The change-over switch 110 in FIG. 12A is changed to the fixed contact A position for the normal recording mode (simultaneous monitoring mode) and to the fixed contact B position for the mixing mode by the after-recording. In the mixing mode by after-recording, the signal supplied to the input terminal 1 is fed through the A/D converter 2 and switch 110 to the digital adder 300 where it is added to the signal reproduced from the magnetic tape 8 and passed through the reproduce amplifier 10, the switch circuit 29, and the digital-signal processing circuit 13. This added signal from the adder 300 is again fed to the digital recording-signal processing circuit 3. Since as described previously, the recording signal is required to be completed within the period in which the record head is on the tape, it is compressed in its timebase by the timebase compressing RAM 25, and is fed through the switch circuit 26 and the recording amplifier 5 to the record head by which it is recorded on the tape 8 within the period in which the record head is on the tape. The recorded signal is reproduced by the heads 36 and 34 and then amplified by the amplifier 10. The output of the amplifier 10 is supplied through the switch circuit 29 (which is closed only when the reproduce head is on the tape) to the digital reproducing-signal processing circuit 13. The digital data (the timebase compressed signal) stored in the RAM 30 for timebase expansion is read in response to the read timing signal to the RAM 30 and thus restored to its original timebase. This digital data is converted by the D/A converter 14 to an analog signal, which is then fed through the buffer amplifier 220 to the terminal 15.

Figure 12B:
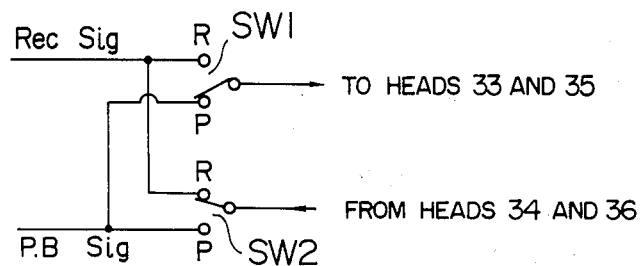
FIG. 12B shows a switch circuit.

In this embodiment, switch circuits SW1 and SW2 as shown in FIG. 12B are respectively provided on the recording and reproducing system signal lines, for example, after the recording amplifier 5 and before the reproducing amplifier 10, thereby enabling the switching of the simultaneous monitoring function shown in the first embodiment and the mixing function by after-recording. In other words, when the switch circuits SW1 and SW2 are changed to the fixed-contact R-position, this embodiment operates as a simultaneous monitor, while when they are changed to the fixed-contact P-position, it functions to mix by after-recording. At this time, the change-over switch 110 must be changed in position in accordance with the modes.

Figure 13:
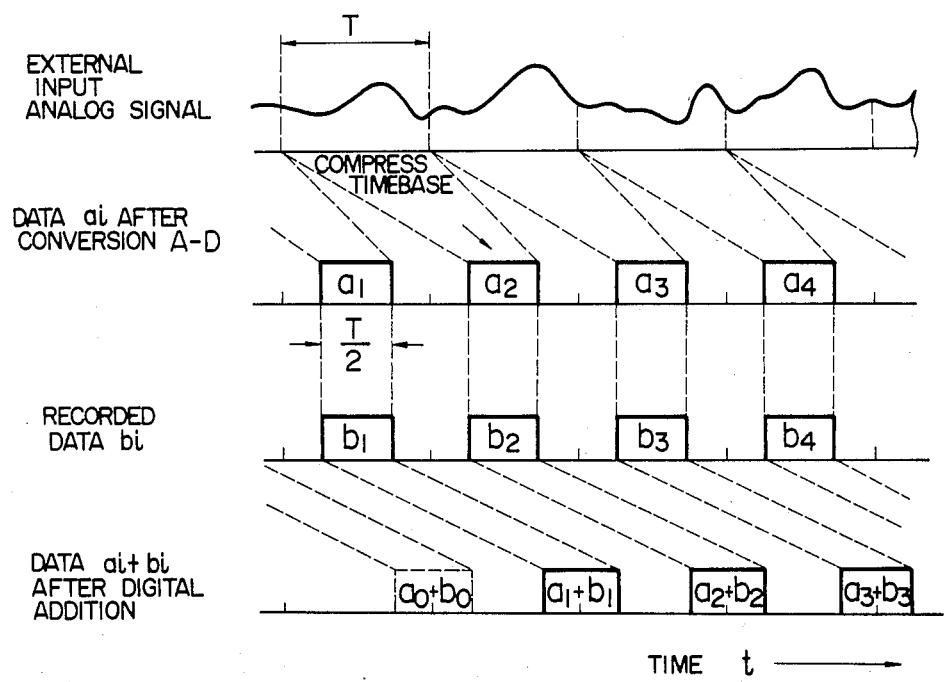
FIG. 13 is a waveform diagram of each signal, showing the record/reproduce timing.

FIG. 13 is a timing chart for recording and reproducing. As shown in FIG. 13, the external analog signal to be mixed with the signal previously recorded on the tape continuously changes with time. This signal is converted from analog to digital form and is then compressed in its timebase so that the interval of time T is reduced to T/2. On the other hand, the signal previously recorded on the tape is reproduced as discontinuous data as shown by bi in FIG. 13. The external input signal ai compressed in a timebase and the discontinuous data bi are added in digital manner. This added signal is delayed by a time corresponding to one-scan or several scans of the head (one-scan time in the illustrated example), and then fed to the record head by which it is recorded on the tape.

Figure 14:
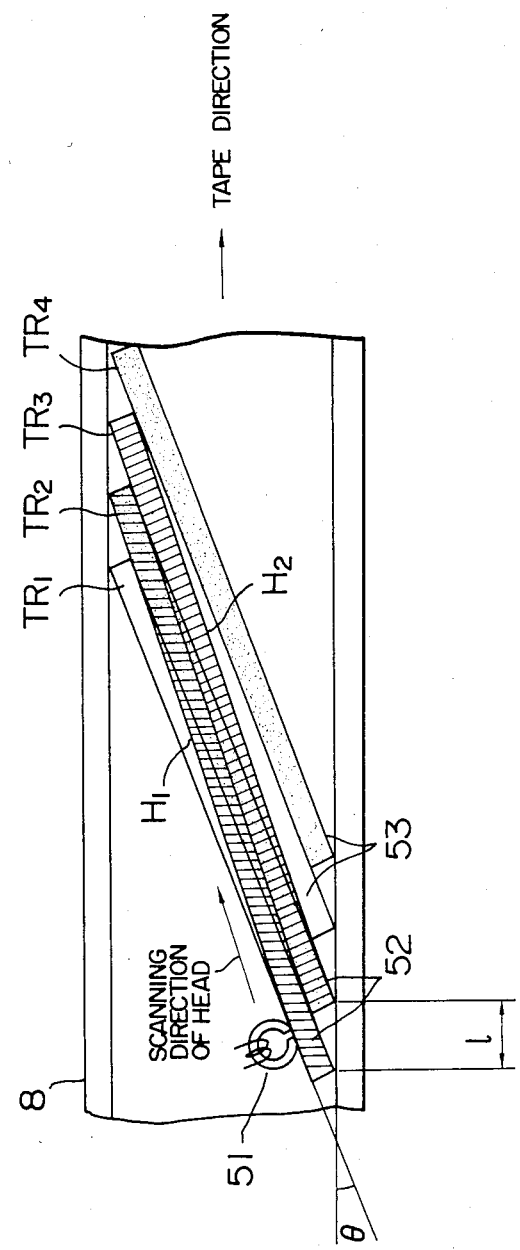
FIG. 14 shows the way to move heads and recorded pattern on the tape, according to a rotating-head PCM recorder of this invention.

FIG. 14 shows the state in which the record head scans at the above timing. In FIG. 14, 51 indicates the position of the head on the tape 8 at a certain time, and the hatched areas 52 show the traces of the heads on the tape which is stopped. The trace of the preceding reproduce head is the upper left trace H1 of the two traces, and the following record head scans as shown by the lower right trace H2. If, now, the tape is moved by the distance l as shown during the time in which the head makes one scan, tracks TR1, TR2, TR3, TR4 . . . are formed on the tape under actual tape transport, which is different from the case where only the head is moved. That is, the trace H1 of the head coincides with the track TR1 in the recorded pattern, the trace H2 of the head coincides with the track TR2. Thus, in order that the information on the track TR1 is read by the preceding reproduce head, is added to the signal to be mixed therewith, and is then written on the track TR1, it is necessary to use the record head for the trace H2.

Figure 15:
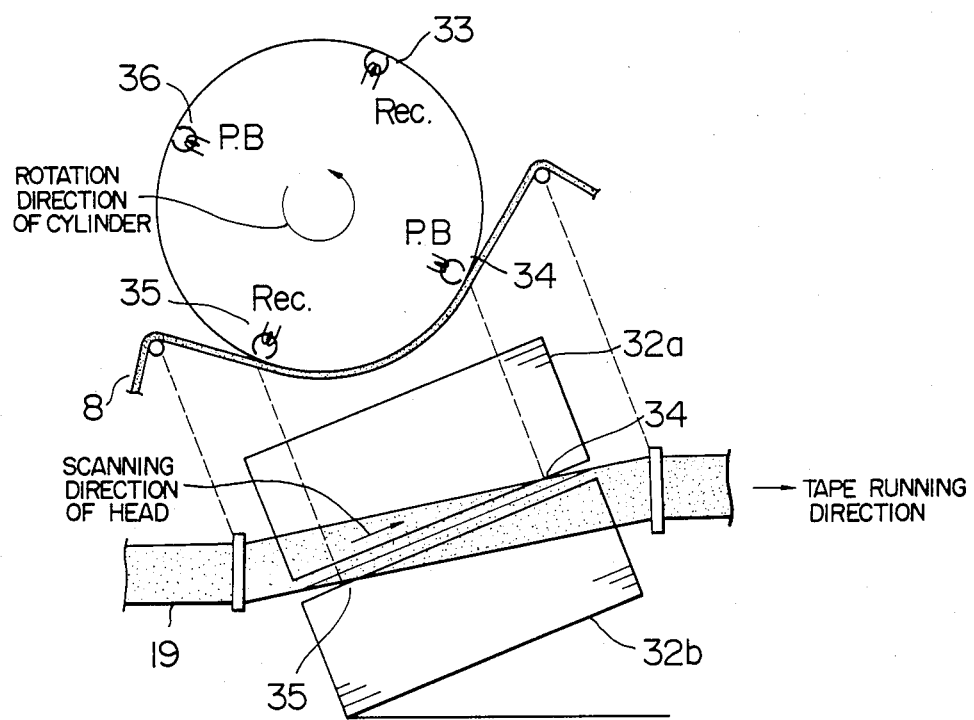
FIG. 15 shows the cylinder and its periphery.

FIG. 15 shows the arrangement of the heads scanning as described above on the cylinder. In FIG. 15, 32a indicates the upper rotating cylinder, 32b the lower fixed cylinder, 34 the reproduce head, and 35 the record head. The feature of this invention in the arrangement of heads is that, as shown in FIG. 15, the reproduce head 34 is mounted on the upper side along the cylinder axis relative to the position of the record head, so as to proceed in the direction in which the tape is supplied. If the reproduce and record heads are mounted to be displaced from each other in the track width direction as described above, the reproduce head can be moved ahead of the record head, thereby reproducing the signal. While in FIG. 15, the reproduce head is mounted so as to be one-track ahead of the record head, the reproduce head may be one to several tracks ahead of the record head because the number of tracks by which the reproduce head is ahead of the record head is determined only by the arrangement of the heads.

Thus, such arrangement of the reproduce and record heads and the provision of the digital adder and so on makes it possible that the signal to be mixed at any point is added to the original data and then recorded on the original track while the reproduced signal is being monitored. Moreover, if an address signal is simultaneously recorded on the data track, the so-called punch-in function by which information is inserted with the precision of a track unit can be realized.

Moreover, since it is possible that the reproduce head moving ahead of the record head reproduces the signal from the recorded track, is added to the external analog input signal in digital manner, and then is recorded on the original track, the mixing by after-recording which employs digital addition, the so-called sound-on-sound mechanism, can be realized which was so far entirely impossible in a rotating head system.

What is claimed is:

1. A helical-scan type rotating head PCM record/reproduce apparatus comprising:
   (a) PCM recording signal processing means having a convertor for converting an analog input signal to a digital signal, and digital signal processing means for adding an error detecting/correcting signal to said digital signal;
   (b) record/reproduce means for recording an output signal from said PCM recording signal processing means on a magnetic tape in an oblique direction and reproducing said recorded output signal, said means having first and second record heads and first and second reproduce heads alternately disposed in the rotating direction;
   (c) PCM reproducing signal processing means having a digital-signal processing circuit for performing error detection/correction process to the signal from said reproduce head, and a D/A converter for converting said processed signal to the original signal; said first record and reproduce heads and second record and reproduce heads of said record/reproduce means being disposed with a spacing of not more than 90°, and said record heads being displaced by a predetermined track width from said reproduce heads in the track width direction so that the same track is traced by said record and reproduce heads;
   (d) storage devices coupled to said digital-signal processing circuits of said PCM recording signal and reproducing signal processing means so as to write the digital signals from said processing circuits and to read at different time from said writing time;
   (e) record/reproduce change-over switch circuits provided on the lines for a signal to be recorded and for a reproduced signal of said PCM recording signal and reproducing signal processing means so as to turn on and off said signals, respectively; and
   (f) control means coupled to said digital signal processing circuits and said switch circuits of said PCM recording signal and reproducing signal processing means so as to compress, expand and on-off control the digital signals, said control means including a timebase-conversion control section coupled to said digital-signal processing circuits of said PCM recording signal and reproducing signal processing means so as to compress the timebases of the digital signals in said digital-signal processing circuits to within a head-rotation angle of 90°, and expand the timebases of said timebase compressed signals to a head-rotation angle of 180°, and a record/reproduce switching control section coupled to said switch circuits of said PCM recording signal and reproducing signal processing means so as to alternately turn on and off said switch circuits in association with said timebase compression and expansion time,
   whereby said digital signal is recorded and reproduced alternately and intermittently.

2. A PCM record/reproduce apparatus according to claim 1, wherein said PCM recording signal processing means further includes a digital adder coupled to said digital-signal recording and producing processing circuits so as to mix the digital signal from said signal processing circuit and the output digital signal from the A/D converter of said PCM recording signal processsing means and to supply said mixed signal to said digital-signal recording processing circuit.

* * * * *